United States Patent
Cahill

(10) Patent No.: US 12,467,825 B2
(45) Date of Patent: Nov. 11, 2025

(54) OPTICAL TIME DOMAIN REFLECTOMETRY (OTDR) DEVICE AND METHODS

(71) Applicant: II-VI Delaware, Inc., Wilmington, DE (US)

(72) Inventor: Michael Cahill, Melbourne (AU)

(73) Assignee: II-VI DELAWARE, INC., Wilmington, DE (US)

( * ) Notice: Subject to any disclaimer, the term of this patent is extended or adjusted under 35 U.S.C. 154(b) by 10 days.

(21) Appl. No.: 18/490,045

(22) Filed: Oct. 19, 2023

(65) Prior Publication Data

US 2025/0130136 A1    Apr. 24, 2025

(51) Int. Cl.
*G01M 11/00* (2006.01)

(52) U.S. Cl.
CPC .............................. *G01M 11/3145* (2013.01)

(58) Field of Classification Search
CPC ............. G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; H04B 10/071
See application file for complete search history.

(56) References Cited

U.S. PATENT DOCUMENTS

| | | | | | |
|---|---|---|---|---|---|
| 4,548,494 A | * | 10/1985 | Geckeler | ............... | G02B 6/3803 356/73.1 |
| 4,812,038 A | * | 3/1989 | Nazarathy | .......... | G01M 11/3118 356/73.1 |
| 4,960,989 A | * | 10/1990 | Liebenrood | ........ | G01M 11/3145 356/73.1 |
| 5,066,118 A | * | 11/1991 | Buerli | ................ | G01M 11/3145 356/73.1 |
| 5,069,544 A | * | 12/1991 | Buerli | ................ | G01M 11/3145 356/73.1 |
| 5,148,230 A | * | 9/1992 | Lane | ................... | G01M 11/3145 356/73.1 |
| 5,155,439 A | * | 10/1992 | Holmbo | ............. | G01M 11/3145 324/534 |

(Continued)

*Primary Examiner* — Gordon J Stock, Jr.
(74) *Attorney, Agent, or Firm* — McAndrews, Held & Malloy, Ltd.

(57) ABSTRACT

An optical time domain reflectometry (OTDR) device includes an optical transmitter, an optical receiver with multiple operating settings, an optical coupler, and a processor. The optical transmitter generates a probe signal comprising a train of pulses. The optical receiver generates time-varying measurements of a back-reflected signal resulting from injection of respective pulses of the probe signal into an optical fiber link. The optical coupler injects the probe signal from the optical transmitter into the optical fiber link and directs the back-reflected signal from the optical fiber link to the optical receiver. The processor generates a probe trace of the optical fiber link from first time-varying measurements of the back-reflected signal, identifies an intra-scan first transition point from the probe trace, and generates a range-extended trace of the optical fiber link from second time-varying measurements of the back-reflected signal in which the optical receiver transitions from a first operating setting to a second operating setting at the intra-scan first transition point.

20 Claims, 12 Drawing Sheets

(56) References Cited

U.S. PATENT DOCUMENTS

| | | | | |
|---|---|---|---|---|
| 5,442,434 | A | * | 8/1995 | Liao .................. G01M 11/3145 356/73.1 |
| 5,465,143 | A | * | 11/1995 | Chu .................. G01M 11/3145 356/73.1 |
| 5,491,548 | A | * | 2/1996 | Bell .................. G01M 11/3145 356/73.1 |
| 5,552,881 | A | * | 9/1996 | Jezwinski .......... G01M 11/3136 356/73.1 |
| 9,423,316 | B2 | * | 8/2016 | Perron ............... G01M 11/3145 |
| 9,651,450 | B2 | * | 5/2017 | Viswanathan ..... G01M 11/3145 |
| 10,014,935 | B2 | * | 7/2018 | Perron ................ H04B 10/071 |
| 10,107,714 | B2 | * | 10/2018 | Xu ....................... H04B 10/071 |
| 10,305,586 | B1 | * | 5/2019 | Kassler ............... H04B 10/071 |
| 10,564,068 | B2 | * | 2/2020 | Gurusami .......... G01M 11/3109 |
| 11,296,784 | B1 | | 4/2022 | Cahill |
| 11,405,102 | B1 | | 8/2022 | Cahill et al. |
| 2023/0152183 | A1 | | 5/2023 | Cahill et al. |

\* cited by examiner

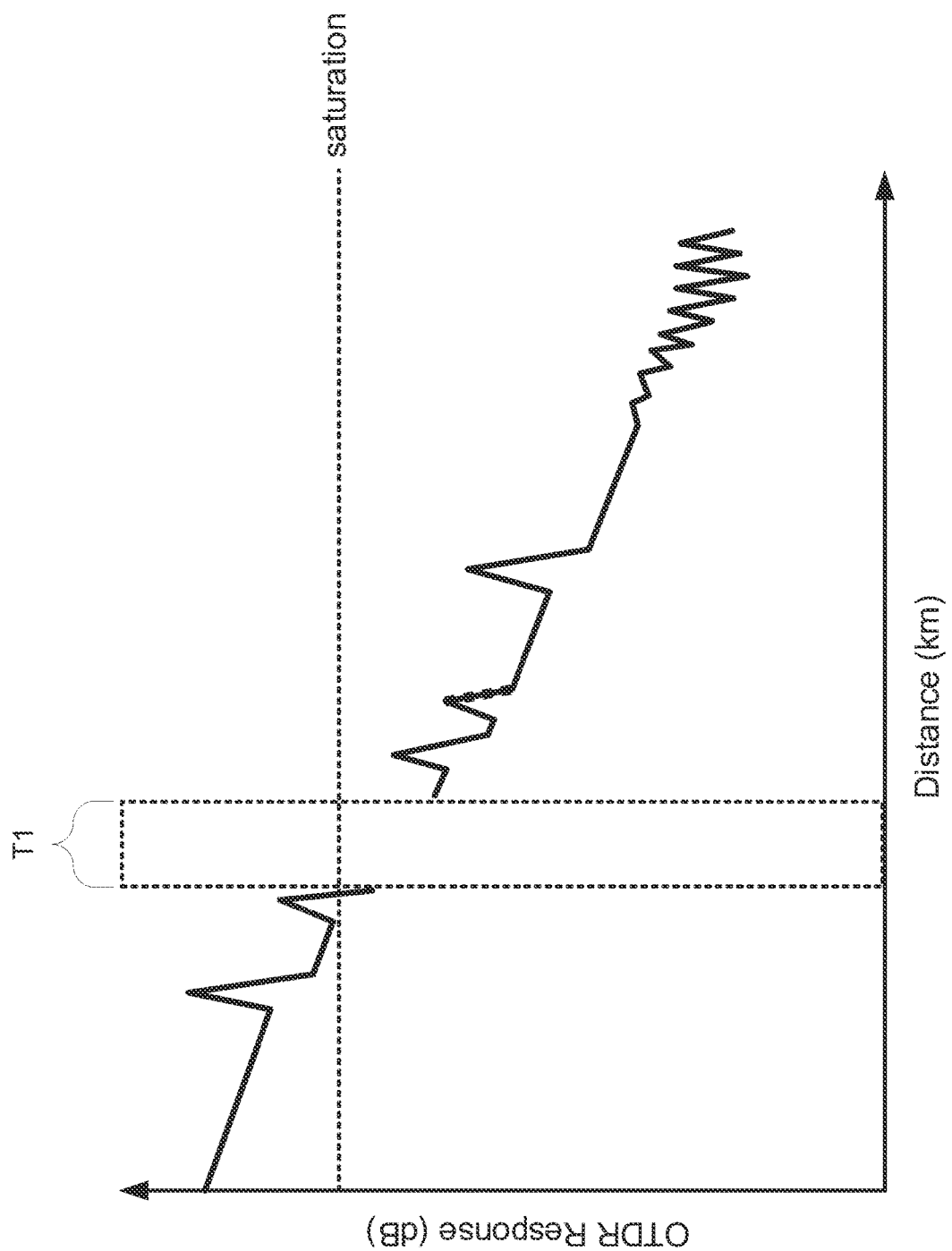

OPTICAL TIME DOMAIN REFLECTOMETRY (OTDR) DEVICE AND METHODS

TECHNICAL FIELD

Aspects of the present disclosure are related to optical time domain reflectometry (OTDR) devices and methods for generating OTDR traces of an optical fiber.

BACKGROUND

OTDR devices may determine the optical characteristics of an optical fiber link such as attenuation, reflections, and the like, in order to optimize the working levels of associated transmitter and receiver equipment. An OTDR device typically includes an optical source used to generate a multitude of optical pulses that are injected into the optical fiber under test, and an optical receiver for detecting light from the optical source that is back-reflected by the optical fiber. An associated processor may process the back-reflected signal detected by the optical receiver to create an OTDR trace that defines the overall loss along the optical fiber span and that identifies physical changes/reflection points (e.g., connectors, splices, and the like) along the measured span.

While OTDR traces are a useful tool in assessing the operational health of an optical fiber link, the operational range of OTDR devices is limited by various factors such as an amount of optical power that may be launched into a given optical fiber link, a length of the optical fiber link, and a duration of time users are willing to wait for the OTDR device to produce an OTDR trace.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Shown in and/or described in connection with at least one of the figures, and set forth more completely in the claims, are optical time domain reflectometry (OTDR) devices and associated processes for generating OTDR traces of optical fiber links under test. For some embodiments, the OTDR devices and processes may effectively produce OTDR traces of an expanded dynamic range with only a slight increase in the time required to produce such OTDR traces when compared to conventional OTDR devices and techniques.

These and other advantages, aspects and novel features of the present disclosure, as well as details of illustrated embodiments thereof, will be more fully understood from the following description and drawings.

BRIEF DESCRIPTION OF THE DRAWINGS

Various features and advantages of the present disclosure may be more readily understood with reference to the following detailed description taken in conjunction with the accompanying drawings, wherein like reference numerals designate like structural elements.

FIG. 3B depicts a first example OTDR trace in which the OTDR device transitions the optical receiver at a first intra-scan transition point.

FIG. 4A-4C depicted a flow chart for an example OTDR process implemented by an embodiment of the OTDR device of FIG. 1, in which FIG. 4A depicts an OTDR probe trace process, FIG. 4B depicts an OTDR clear trace process, and FIG. 4C depicts an OTDR opaque trace process.

DESCRIPTION

Figure 1:
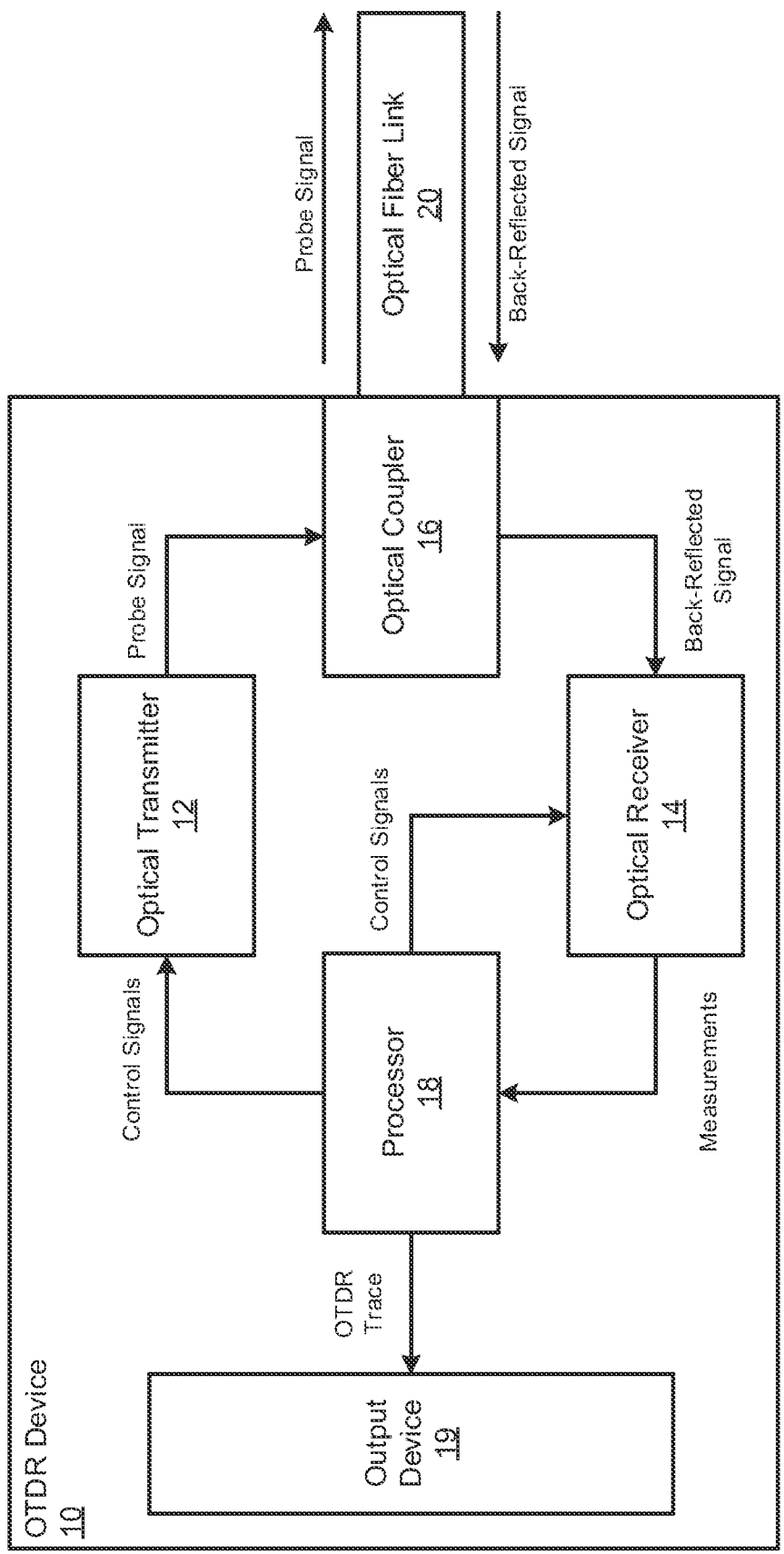
FIG. 1 depicts a block diagram of an example OTDR device coupled to an optical fiber link.

The following discussion provides various examples of an optical time domain reflectometry (OTDR) device and associated processes for producing OTDR traces. Such examples are non-limiting, and the scope of the appended claims should not be limited to the particular examples disclosed. In the following discussion, the terms "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Aspects of the present disclosure are directed to OTDR devices and processes for generating OTDR traces. In various embodiments, the OTDR device may generate an OTDR probe trace before generating an OTDR range-extended trace. In particular, the OTDR device may generate the OTDR probe trace based on measurements acquired during an initial interrogation period (e.g., 10 seconds) using operating settings that avoid saturation effects for the entirety of the trace. Based on the OTDR probe trace, the OTDR device may identify one or more transition points corresponding to time periods or distance ranges in which operating settings of the OTDR device may be transitioned during a single pulse or scan of the optical fiber link. During a longer interrogation period (e.g., 180 seconds), the OTDR device may inject an optical pulse into the optical fiber link and generate scan measurements of the optical pulse reflected back to the OTDR device by the optical fiber link. During the generation of time-varying measurements of the back-reflected signal for a single pulse, the OTDR device may transition operating settings of the OTDR device at the identified transition points. Such transitioning may extend the effective range of the OTDR device, thus permitting the OTDR device to output an OTDR range-extended trace that includes characteristics of the optical fiber link at greater distances from the OTDR device.

Turning now to FIG. 1, an OTDR device 10 coupled to an optical fiber link 20 is shown. The OTDR device 10 may interrogate the optical fiber link with probe signals and may produce an OTDR trace based on portions of the probe signal reflected by the optical fiber link 20 back to the OTDR device 10. While represented in FIG. 1 as a standalone device, the OTDR device 10 may be integrated into an optical node of optical communication equipment.

As shown, the OTDR device 10 may include an optical transmitter 12, an optical receiver 14, an optical coupler 16, a processor 18, and an output device 19. The optical transmitter 12 may generate an optical probe signal that is coupled to a near end of the optical fiber link 20 via the optical coupler 16. Injection of the optical probe signal into the optical fiber link 20 may create a back-reflected signal. In various embodiments, the optical probe signal may comprise a train or series of light pulses. In particular, the light pulses may be spaced such that each light pulse has sufficient time to travel from the near end of the optical fiber link 20 to the far end of the optical fiber link 20 and back to the near end of the optical fiber link 20 before the next light pulse is injected into the near end of the optical fiber link 20.

The optical receiver 14 (e.g., a photodetector and transimpedance amplifier) may generate an electrical signal based on the back-reflected optical signal for each pulse of the probe signal. In particular, each scan of the optical fiber link 20 may comprise the optical transmitter 12 injecting a pulse into the optical fiber link 20 and the optical receiver 14 generating time-varying measurements based on the back-reflected signal. Thus, by injecting a train or series of pulses into the optical fiber link 20, the OTDR device 10 may produce separate scan measurements of the optical fiber link for each pulse of the probe signal. Moreover, the optical receiver 14 may have a plurality of sensitivity levels from which the processor 18 may select. In particular, the processor 18 may generate first control signals which cause the optical receiver 14 to operate at a first sensitivity level and may generate second control signals which cause the optical receiver 14 to operate at a second sensitivity level.

In one embodiment, the first sensitivity level is associated with a low gain level of the optical receiver 14 and the second sensitivity level is associated with a high gain level of the optical receiver 14. In another embodiment, the first sensitivity level is associated with a high attenuation level of the optical receiver 14 and the second sensitivity level is associated with a low attenuation level of the optical receiver 14. While various embodiments of the optical receiver 14 are described as having two sensitivity levels (e.g., a low sensitivity level and a high sensitivity level) or two operating levels, the optical receiver 14 may be implemented with multiple operating levels, thus permitting multiple transitions during a scan measurement and/or providing the processor 18 greater flexibility in selecting a suitable transition point and operating level of the optical receiver 14.

The optical coupler 16 may control or direct the flow of the optical probe signal from the optical transmitter 12 to the optical fiber link 20 and the flow of the back-reflected signal from the optical fiber link 20 to the optical receiver 14. Various other arrangements may be used to control the directions of the propagating signals.

The processor 18 may process measurements of the back-reflected signal and construct one or more OTDR traces from such measurements. Moreover, the processor 18 may control the operation of the optical transmitter 12 and the optical receiver 14 as explained in greater detail below with regard to the process of FIGS. 4A-4C.

To this end, the processor 18 may include a microprocessor, a microcontroller, and/or some other general processing unit configured to execute software, firmware, and/or other instructions and perform tasks based on the execution of such instructions. Such instructions may be embedded in firmware of the processor 18, stored in memory of the processor 18, and/or stored in a memory external to the processor 18. In some embodiments, one or more tasks or aspects of the processor 18 may be implemented using one or more application specific integrated circuit (ASIC) components, one or more analog circuit components, and/or one or more digital circuit components in addition to or instead of a general processing unit.

As further shown, the OTDR device 10 may include one or more output devices 19. For example, the output devices 19 may include display devices, networking devices, and/or storage devices. The processor 18 may use such output devices 19 to provide a generated OTDR trace and/or associated measurements to a person and/or another device. For example, the processor 18 may graphically present a generated OTDR trace via a display device in order to convey operating characteristics of the optical fiber link 20 to a person operating the OTDR device 10.

Figure 2A:
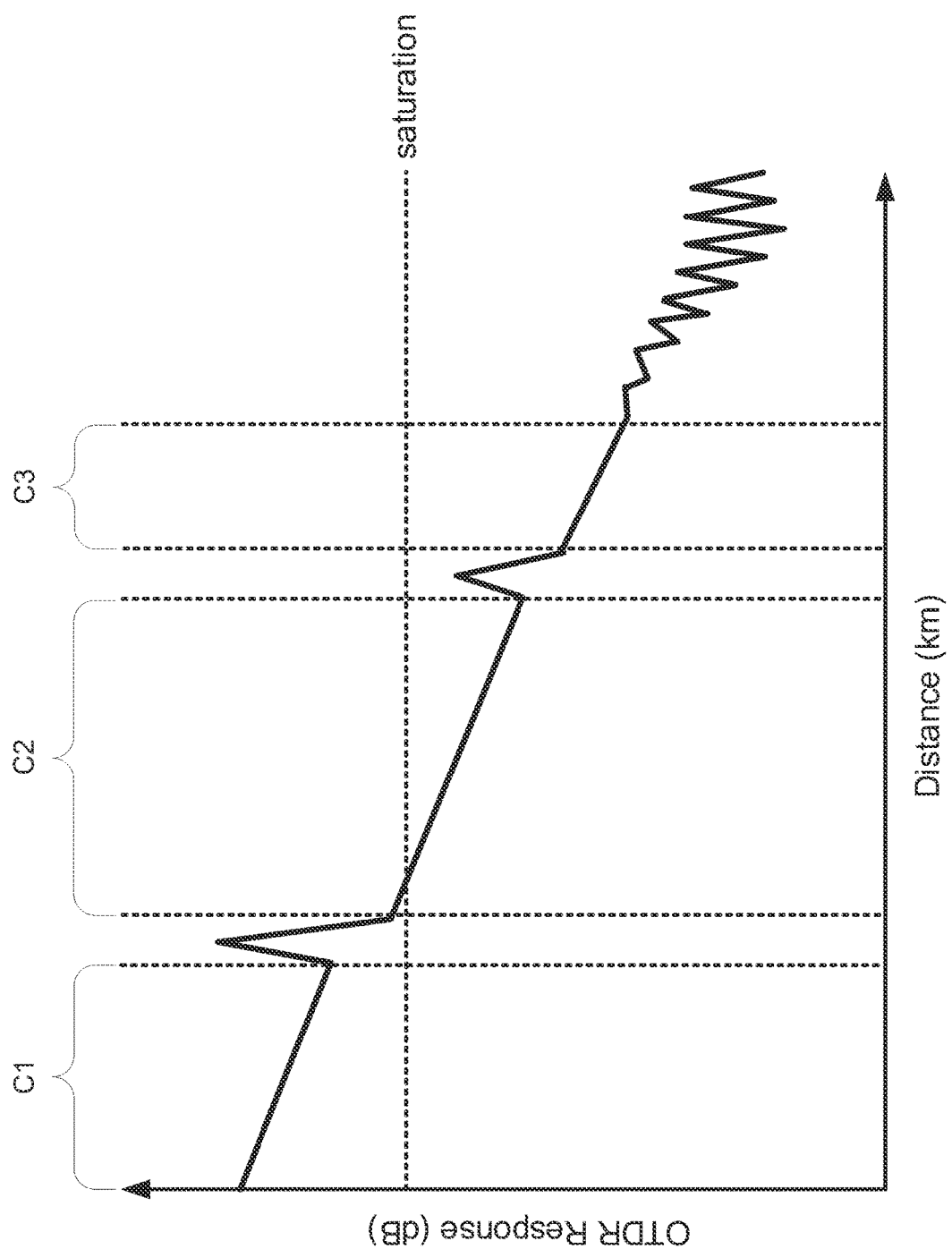
FIG. 2A depicts an example OTDR probe trace of an optical fiber link with one or more "clear" ranges.

FIG. 2A shows an example OTDR probe trace that may be constructed by the processor 18 as a result of injecting a pulse signal into the optical fiber link 20 and generating time-varying measurements of the back-reflected signal. In particular, the OTDR trace may depict optical power loss (in dB) of the back-reflected signal as a function of time (e.g., microseconds) or distance (e.g., kilometers) along optical fiber link 20. As shown, the OTDR trace may include spikes, drops, or other events associated with various distances along the optical fiber link 20. In the absence of optical fiber link events along its length, the back-reflected signal exponentially decreases (i.e., linearly decreases on the logarithmic scale of the depicted traces) as a function of time or distance. Distance traveled by the back-reflected signal is directly proportional to the time the pulse takes to propagate along both directions of the optical fiber link 20 (i.e., from optical transmitter 12 to reflection location and back to optical receiver 14). As such, time and distance may be used interchangeably with regard to the various OTDR traces presented or otherwise described herein.

In an attempt to increase the range of the OTDR device 10 and its generated OTDR traces, the processor 18 may transition the optical receiver 14 to a higher sensitivity level. When operating at the higher sensitivity level, the optical receiver 14 may detect and generate time-varying measurements for portions of the back-reflected signal that correspond to further distances of the optical fiber link 20. However, as further depicted in FIG. 2A, portions of the back-reflected signal that correspond to closer distances of the optical fiber link 20 would exceed the saturation level of the optical receiver 14 if operated at the higher sensitivity level. Thus, if the OTDR device 10 performs a scan with the optical receiver 14 operating at the lower sensitivity level, then the OTDR device 10 may not be able to detect back-reflected signals associated with further distances. However, if the OTDR device 10 performs a scan with the optical receiver 14 operating at the higher sensitivity level, then the back-reflected signal associated with closer distances may saturate the optical receiver 14.

Such saturation may result in a loss of OTDR information for closer distances since measurements provided by the optical receiver 14 do not accurately reflect the back-reflected signal level when the optical receiver 14 is saturated. Moreover, the optical receiver 14 may require a settling period after saturation. During such settling period, measurements provided by the optical receiver 14 may be inaccurate or otherwise unreliable. Thus, even after the back-reflected signal drops below the saturation level of the optical receiver 14, the OTDR device 10 may experience a loss of OTDR information as the optical receiver 14 recovers from saturation during this settling period. As such, in various embodiments, the OTDR device 10 may attempt to avoid saturation of the optical receiver 14 in order to increase an amount of OTDR information gathered.

In light of this, the OTDR device 10 per the present disclosure may generate an OTDR probe trace with the optical receiver 14 operating at its lower sensitivity level. The processor 18 may analyze this OTDR probe trace to identify one or more transition points at which to increase the sensitivity level of the optical receiver 14. In particular, the processor 18 may select transition points associated with distances beyond which the back-reflected signal would saturate the optical receiver 14 operating at its higher sensitivity level. Further, the processor 18 may select transition points beyond the saturation distance that are associated with "clear" ranges (i.e., distance ranges of the optical fiber link 20 that lack discrete events such as Fresnel reflections, lumped losses, etc.). If processor 18 is unable to identify a clear range beyond the saturation distance, the processor 18 may select a set of transition points beyond the saturation distance that are in "opaque" ranges (i.e., distance ranges of the optical fiber link 20 with discrete events such as Fresnel reflections, lumped losses, etc.). The processor 18 may then generate an OTDR range-extended trace in which the optical receiver 14 transitions from its lower sensitivity level to a higher sensitivity level at the identified transition points. In this manner, the OTDR device 10 may generate an OTDR range-extended trace that comprises a near portion generated based on the lower sensitivity level of the optical receiver 14 combined with a far portion generated based on the higher sensitivity level of the optical receiver 14.

Figure 4A:
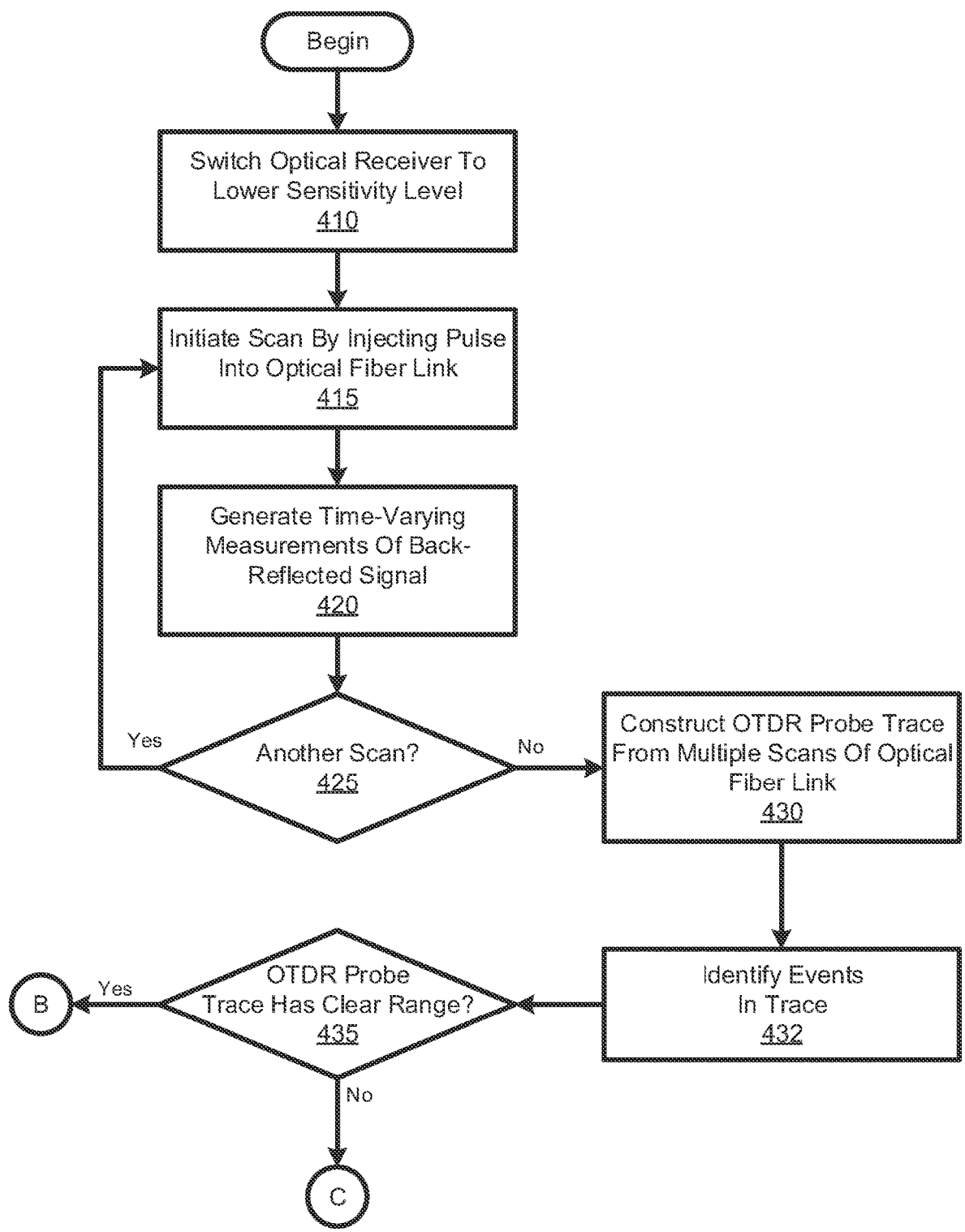
Figure 4B:
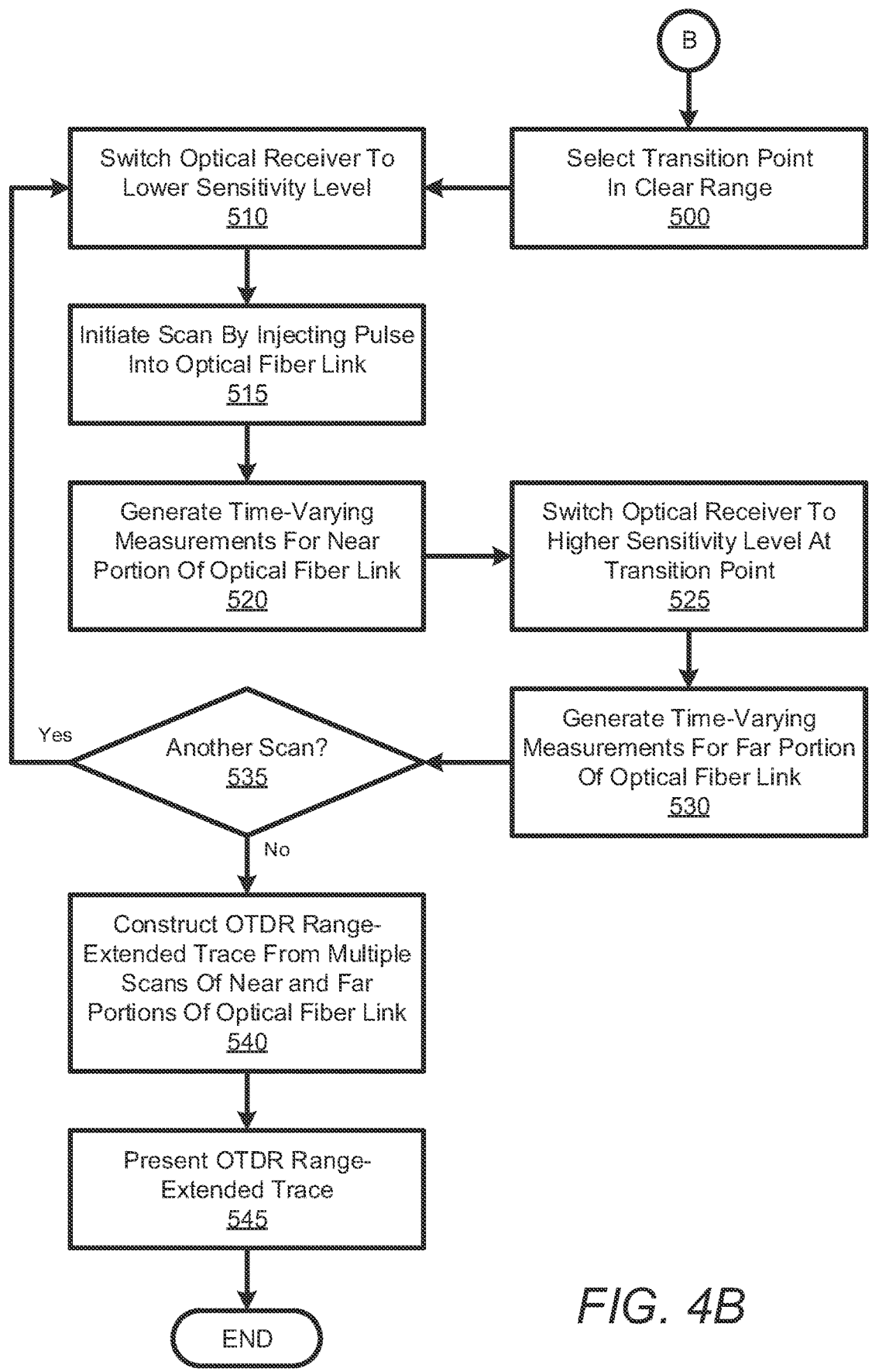
Figure 4C:
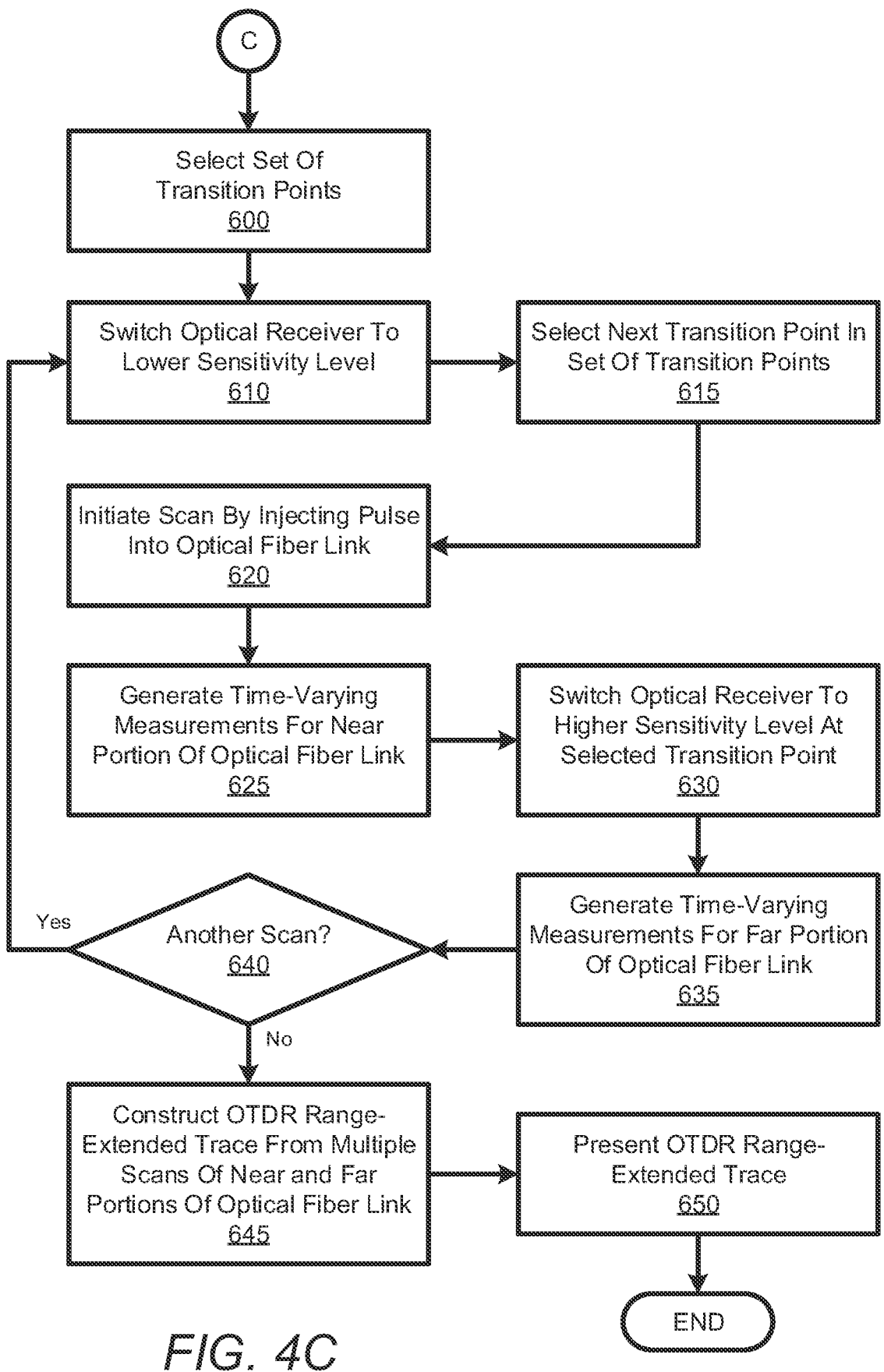

Referring now to FIGS. 4A-4C further details of the above process are addressed with regard to the depicted flow chart. In particular, FIG. 4A depicts a process of the OTDR device 10 for generating an OTDR probe trace. Based on the results obtained from such an OTDR probe trace, the OTDR device 10 may proceed to the OTDR clear trace process of FIG. 4B or the OTDR opaque trace process of FIG. 4C.

At 410, the processor 18 of the OTDR device 10 may prepare the optical receiver 14 for an OTDR probe trace. In particular, the processor 18 may generate one or more control signals which configure the optical receiver 14 to operate at its lower sensitivity level. For example, such signals may transition the optical receiver 14 to its higher attenuation level and/or its lower gain level. The processor 18 at 415 may initiate a scan of the optical fiber link 20 for the OTDR probe trace by generating one or more signals that cause the optical transmitter 12 to inject a pulse of a probe signal into a near end of the optical fiber link 20. In some embodiments, the processor 18 and/or optical transmitter 12 may delay transmission of the pulse until after a transition period of the optical receiver 14 to settle into its new operating level. As a result of the injected pulse, the optical receiver 14 may receive a back-reflected signal from the optical fiber link 20. As the back-reflected signal is received, the optical receiver 14 at 420 may sample the back-reflected signal and/or generate time-varying measurements of the back-reflected signal based on its lower sensitivity level. In this manner, the OTDR device 10 may generate a probe scan of the optical fiber link 20 that includes time-varying measurements of the back-reflected signal for at least a period of time sufficient for the pulse to travel to the far end of the optical fiber link 20 and back to the OTDR device 10.

At 425, the processor 18 may determine whether to perform an additional scan of the optical fiber link 20. In particular, the processor 18 may determine to perform an additional scan if the present scan of the optical fiber link 20 has completed and additional scans for the OTDR probe trace remain. For example, if a length of the optical fiber link 20 is known, the processor 18 may determine that the present scan has completed if a sufficient amount of time has passed for the transmitted pulse to travel to the far end of the optical fiber link 20 and back. Additionally and/or alternatively, the processor 18 may determine that the present scan has completed if measurements of the back-reflected signal have fallen below a threshold level. Moreover, the processor 18 may determine additional scans remain if a predetermined period of time (e.g., 10 seconds) allotted to generating the OTDR probe trace has yet to expire or a predetermined number of scans for generating the OTDR probe trace have yet to be performed.

If an additional scan is to be performed, the processor 18 may return to 415 in order to generate one or more control signals which cause the optical transmitter 12 to transmit another pulse of the probe signal. Otherwise, the processor 18 may proceed to 430 in order to construct an OTDR probe trace from the multiple scans of the optical fiber link 20. For example, the processor 18 may perform various signal processing functions upon the time-varying measurements generated for each pulse of the probe signal so as to construct the OTDR probe trace. See, FIGS. 2A and 3A for example OTDR probe traces.

After constructing the OTDR probe trace, the processor 18 at 432 may perform event analysis on the OTDR probe trace. In particular, the processor 18 may utilize various signal processing techniques to identify discrete events in the OTDR trace such as such as Fresnel reflections, lumped losses, etc.

At 435, the processor 18 may determine whether the OTDR probe trace includes a range after a saturation level of optical receiver 14 that is clear of events. In particular, the processor 18 may utilize the output of the event analysis to identify clear ranges of the OTDR probe trace which lack such identified events. The processor 18 may further compare the duration of each clear range to a transition period or settling time of the optical receiver 14 associated with switching the optical receiver 14 from its lower sensitivity level to its higher sensitivity level. Namely, when the optical receiver 14 transitions from its lower sensitivity level to its higher sensitivity level, the optical receiver 14 may experience a period in which the optical receiver is unable to generate or unable to reliably generate measurements of the back-reflected signal. As such, the processor 18 at 435 may search for a clear range that is long enough for the optical receiver 14 to complete the switch to its higher sensitivity level and resume generation of reliable measurements.

For example, the OTDR probe trace of FIG. 2A includes three clear ranges C1, C2, C3. However, only clear ranges C2 and C3 extend beyond the saturation level. Thus, the processor 18 may identify the clear range C2 or C3 as a suitable period for a transition point. However, in the case of clear range C2, the processor 18 may utilize only the portion of the clear range C2 that is beyond the saturation level so as to avoid saturating the optical receiver 14.

If the processor 18 is able to find such a clear range, then the processor 18 may proceed to the OTDR clear process of FIG. 4B in which intra-scan transitions occur during the identified clear range. Conversely, if the processor 18 is unable to find such a clear range, then the processor 18 may proceed to the OTDR opaque process of FIG. 4C in which intra-scan transitions occur at different transition points across multiple scans of the optical fiber link 20.

Figure 2B:
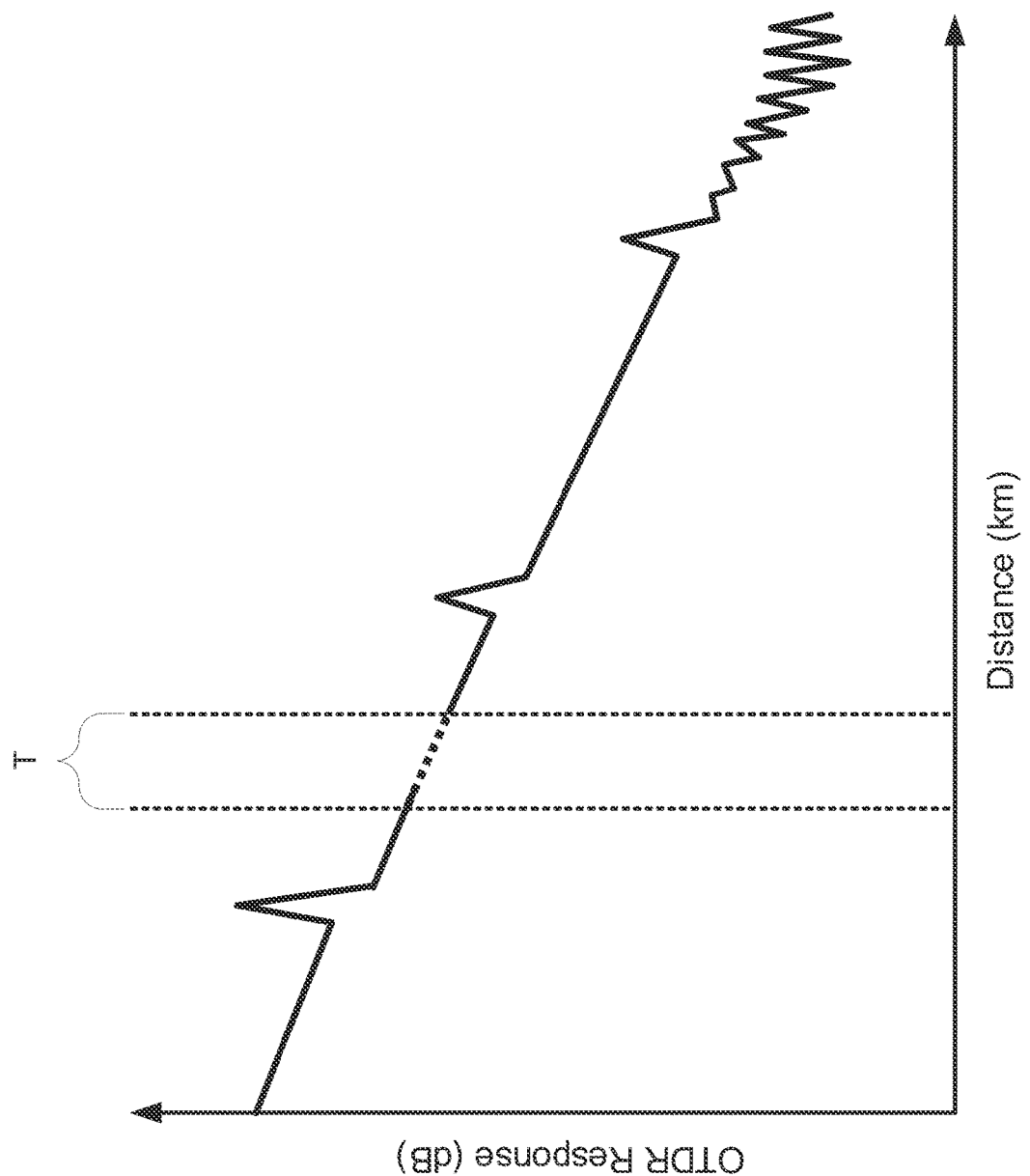
FIG. 2B depicts an example OTDR range-extended trace in which the OTDR device, at an intra-scan transition point associated with a clear range, increases a sensitivity level of an optical receiver.

If the processor 18 identified a suitable clear range past the saturation level associated with the higher sensitivity level of the optical receiver 14, then the processor 18 at 500 may select a transition point in the identified clear range (e.g., at the beginning of the identified clear range but after the saturation level). At 510, the processor 18 of the OTDR device 10 may prepare the optical receiver 14 for an OTDR scan of a near portion of the optical fiber link 20. In particular, the processor 18 may generate one or more control signals which configure the optical receiver 14 to operate at its lower sensitivity level. For example, such signals may transition the optical receiver 14 to its higher attenuation level and/or its lower gain level. The processor 18 at 515 may initiate a scan of the optical fiber link 20 for the OTDR clear trace by generating one or more signals that cause the optical transmitter 12 to inject a pulse of a probe signal into a near end of the optical fiber link 20. In some embodiments, the processor 18 and/or optical transmitter 12 may delay transmission of the pulse until after a transition period suitable for the optical receiver 14 to settle into its new operating level. As a result of the injected pulse, the optical receiver 14 may receive a back-reflected signal from the optical fiber link 20. As the back-reflected signal is received, the optical receiver 14 at 520 may generate, based on its lower sensitivity level, time-varying measurements of the back-reflected signal for a near portion of the optical fiber link 20, which corresponds to a portion of the optical fiber link 20 prior to the transition period of the optical receiver 14. See, e.g., transition period T of FIG. 2B.

At 525, while the injected probe signal is still traversing the optical fiber link, the processor 18 may generate one or more control signals which configure the optical receiver 14 to operate at its higher sensitivity level. For example, such signals may transition the optical receiver 14 to its lower attenuation level and/or its higher gain level. As a result of increasing the sensitivity level of the optical receiver 14, the optical receiver 14 at 530 may generate time-varying measurements of the back-reflected signal for a far portion of the optical fiber link 20, which corresponds to a portion of the optical fiber link 20 after the transition period. See, e.g., transition period T of FIG. 2B. As noted above, the optical receiver 14 may be unable to generate and/or unable to reliably generate measurements during a transition period (e.g., transition period T of FIG. 2B) in which the optical receiver 14 settles after switching to the high sensitivity level. As such, the resulting scan may include a gap period or portion for which the scan lacks reliable measurements.

At 535, the processor 18 may determine whether to perform an additional scan of the optical fiber link 20. In particular, the processor 18 may determine to perform an additional scan if the present scan of the optical fiber link 20 has completed and additional scans for the OTDR clear trace remain. For example, if a length of the optical fiber link 20 is known, the processor 18 may determine that the present scan has completed if a sufficient amount of time has passed for the transmitted pulse to travel to the far end of the optical fiber link 20 and back. Additionally and/or alternatively, the processor 18 may determine that the present scan has completed if measurements of the back-reflected signal have fallen below a threshold level. Moreover, the processor 18 may determine additional scans remain if a predetermined period of time (e.g., 180 seconds) allotted to generating the OTDR clear trace has yet to expire or a predetermined number of scans for generating the OTDR clear trace have yet to be performed.

If an additional scan is to be performed, the processor 18 may return to 510 to prepare the optical receiver 14 for another scan. Otherwise, the processor 18 may proceed to 540 in order to construct an OTDR range-extended trace from the multiple scans of the optical fiber link 20. For example, the processor 18 may perform various signal processing functions upon the time-varying measurements generated for the near portions of each pulse of the probe signal so as to construct a near portion of the OTDR range-extended trace. Further, the processor 18 may perform various signal processing functions upon the time-varying measurements generated for the far portions of each pulse of the probe signal so as to construct a far portion of the OTDR range-extended trace. Moreover, the processor 18 may linearly extrapolate between the near portion and the far portion so as to fill in a gap portion associated with the transition period T of the optical receiver 14. See, e.g., constructed OTDR trace of FIG. 2B. In some embodiments, the processor 18 may further augment the OTDR range-extended trace and/or fill in the gap portion based on the measurements used to construct the OTDR probe trace at 435. In various embodiments, the processor 18 may scale either the near portion up and/or the far portion down so that the near portion and the far portion of the OTDR extended trace measurement of the received power are normalized to represent the measured loss of the optical fiber link 20.

At 545, the processor 18 may output the full OTDR range-extended trace via an output device 19. For example, the processor 18 may display a graphical depiction (e.g., FIG. 2B) of the OTDR range-extended trace via the display device and/or transmit the OTDR range-extended trace and/or associate measurements to another device for further processing and/or presentation.

Figure 3A:
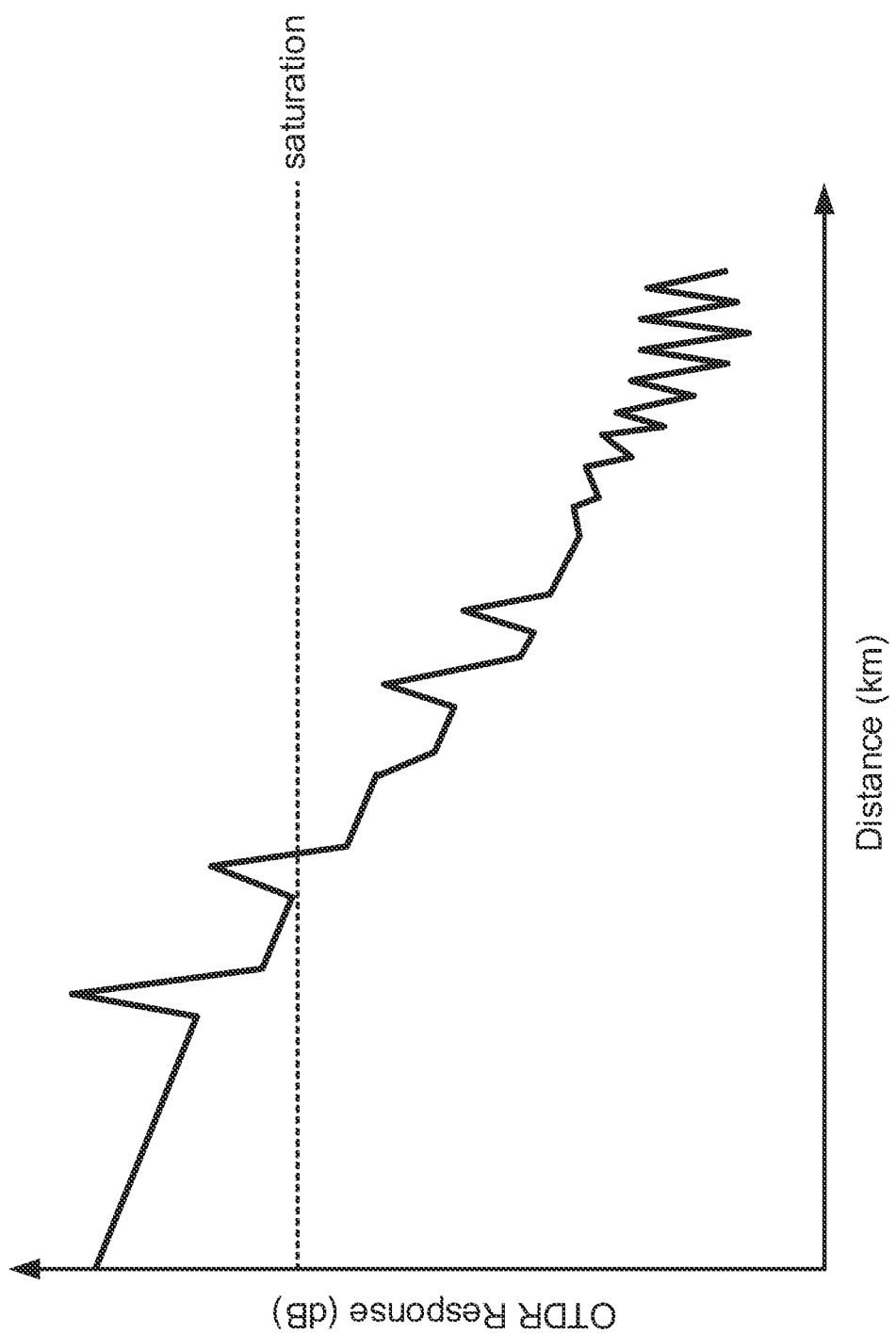
FIG. 3A depicts an example OTDR probe trace of an optical fiber link that lacks a clear range for transitioning the optical receiver.
Figure 3C:
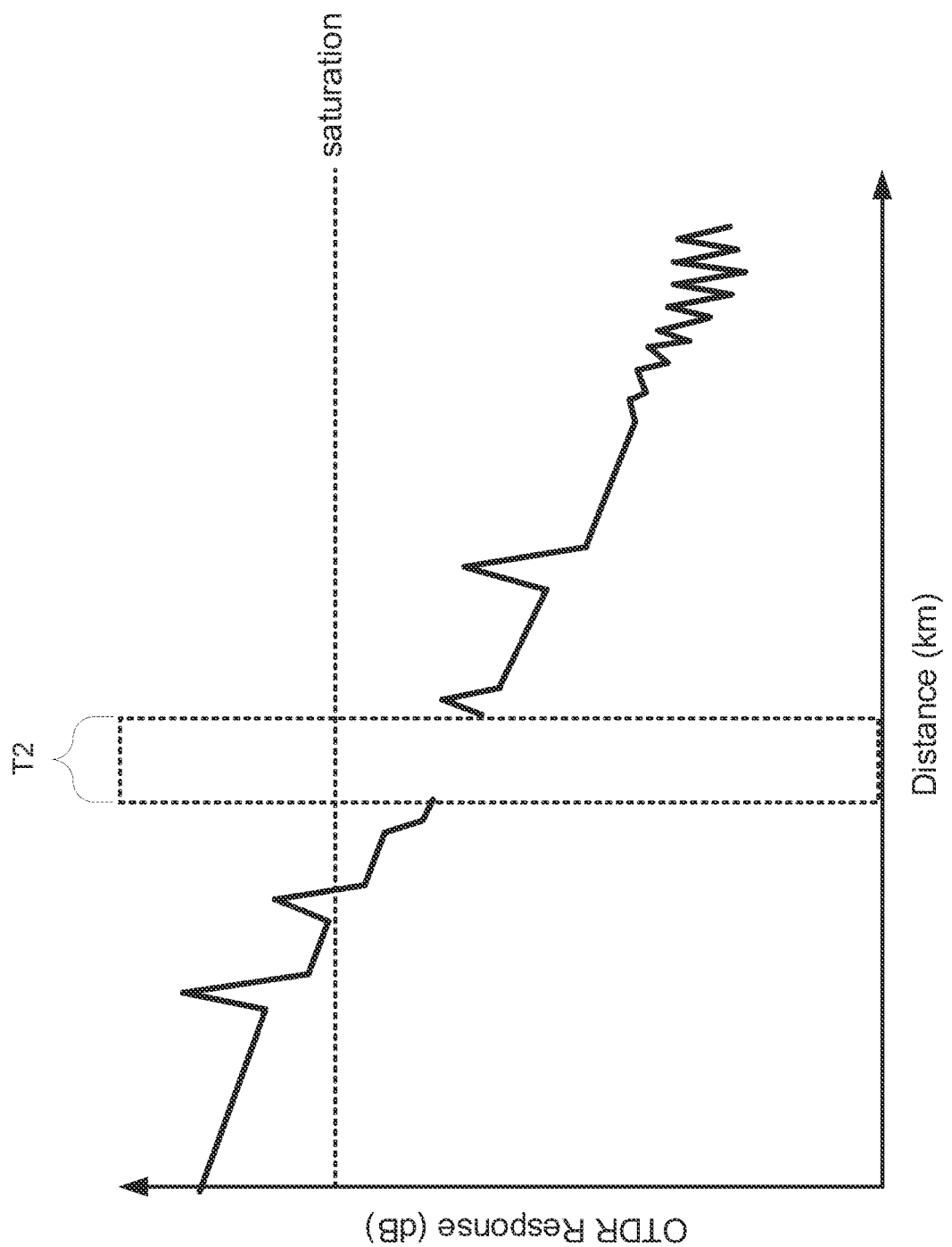
FIG. 3C depicts a second example OTDR trace in which the OTDR device transitions the optical receiver at a second intra-scan transition point.
Figure 3D:
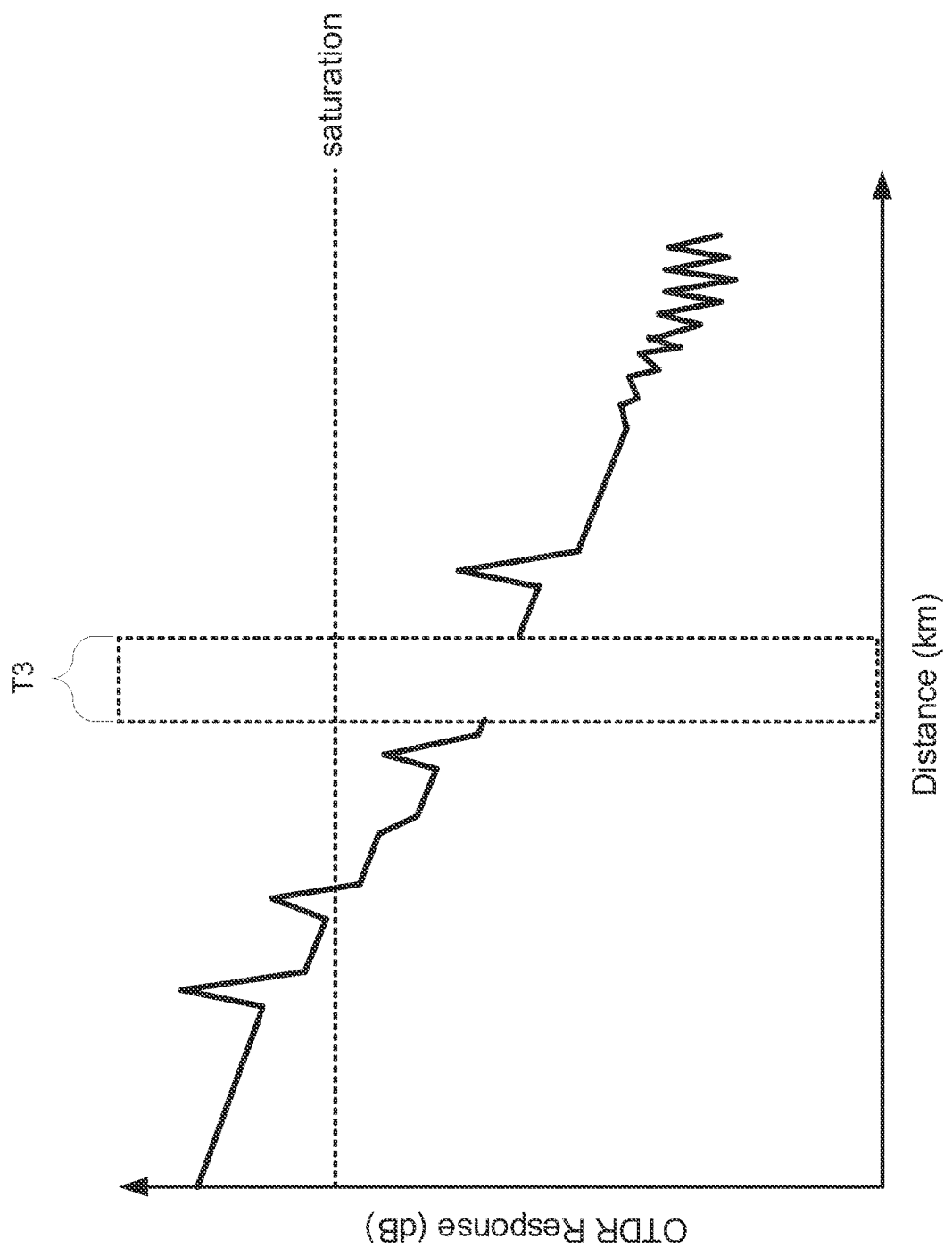
FIG. 3D depicts a third example OTDR trace in which the OTDR device transitions the optical receiver at a third intra-scan transition point.
Figure 3E:
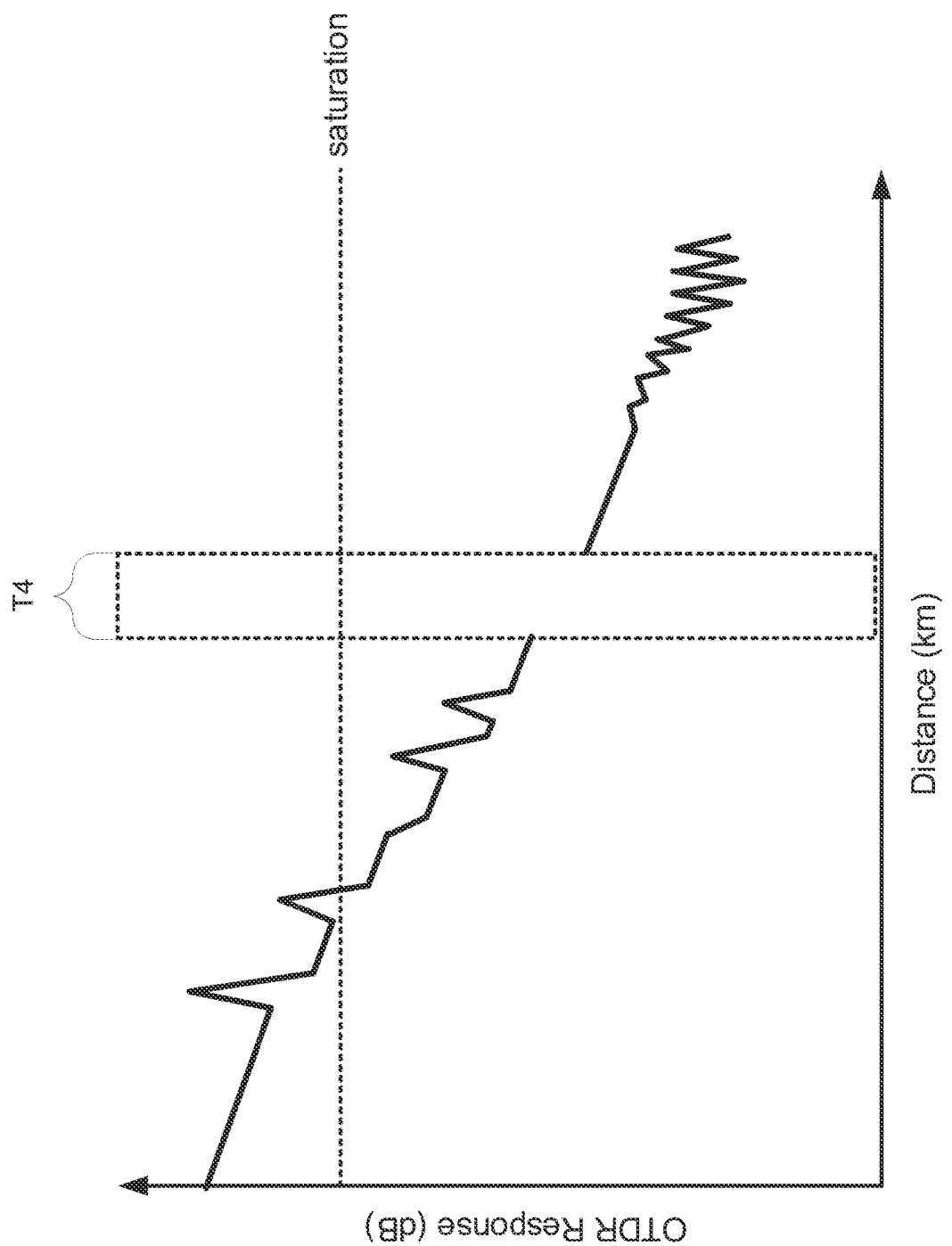
FIG. 3E depicts a fourth example OTDR trace in which the OTDR device transitions the optical receiver at a fourth intra-scan transition point.
Figure 3F:
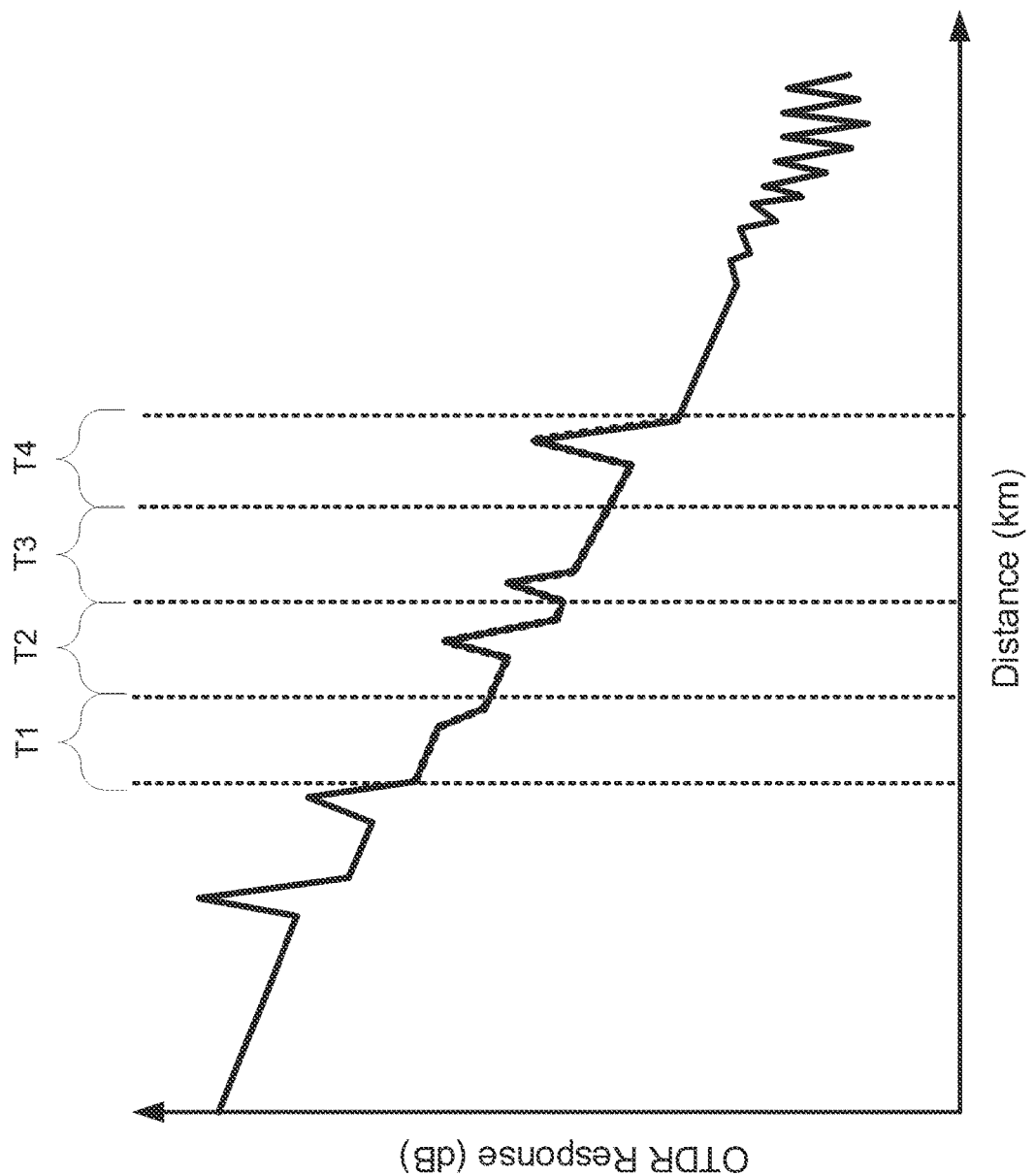
FIG. 3F depicts an example OTDR range-extended trace constructed from the first, second, third, and fourth OTDR traces of FIGS. 3B-3E.

As shown in FIG. 3A, an OTDR probe trace may lack clear ranges after the saturation level of sufficient length for the optical receiver 14 to transition from its low sensitivity level to its high sensitivity level. Thus, if the processor 18 is unable to identify a suitable clear range, then the processor 18 at 600 may select a set of transition points for a plurality of OTDR opaque scans. In one embodiment, the processor 18 selects the transition points such that each transition point is past the saturation level associated with the higher sensitivity level of the optical receiver 14 and within the dynamic range of the optical receiver 14 when operating at its lower sensitivity level. Moreover, the processor 18 selects each transition point such that the resulting transition periods of the optical receiver 14 are non-overlapping. See, e.g., FIG. 3B-3F which depict non-overlapping transition periods T1, T2, T3, T4 that are after the saturation level and within the dynamic range of the optical receiver 14 when operating at its lower sensitivity level.

At 610, the processor 18 of the OTDR device 10 may prepare the optical receiver 14 for an OTDR opaque scan of a near portion of the optical fiber link 20. In particular, the processor 18 may generate one or more control signals which configure the optical receiver 14 to operate at its lower sensitivity level. For example, such signals may transition the optical receiver 14 to its higher attenuation level and/or its lower gain level.

At 615, the processor 18 may select a next transition point Tx from the set of transition points. In one embodiment, the processor 18 may cycle through each of the transition points Tx in order. For example, if there are four transition points corresponding to the start of transition periods T1, T2, T3, T4 of FIGS. 3B-3F, the processor 18 may select the transition point T1 for a first scan, the transition point T2 for a second scan, the transition point T3 for a third scan, the transition point T4 for a fourth scan, cycle back to transition point T1 for a fifth scan, and so on. However, the processor 18 may utilize other algorithms for selecting the next transition point Tx. In some embodiments, the processor 18 may select transition points such that each transition point and its associated transition period is selected for a roughly equal percentage (e.g., ±5%) of the scans. For example, if there are four transition points, the processor 18 may select each for 25%±5% of the scans.

At 620, the processor 18 may initiate a scan of the optical fiber link 20 by generating one or more signals that cause the optical transmitter 12 to inject a pulse of a probe signal into a near end of the optical fiber link 20. In some embodiments, the processor 18 and/or optical transmitter 12 may delay transmission of the pulse until after a transition period suitable for the optical receiver 14 to settle into its new operating level. As a result of the injected pulse, the optical receiver 14 may receive a back-reflected signal from the optical fiber link 20. As the back-reflected signal is received, the optical receiver 14 at 625 may generate, based on its lower sensitivity level, time-varying measurements of the back-reflected signal for a near portion of the optical fiber link 20, which corresponds to the portion of the optical fiber link 20 prior to the selected transition point Tx.

At 630, while the injected probe signal is still traversing the optical fiber link, the processor 18 may generate one or more control signals which cause an intra-scan transition of the optical receiver 14 from the lower sensitivity level to the higher sensitivity level at the select transition point. For example, such signals may transition the optical receiver 14 to its lower attenuation level and/or its higher gain level. As a result of increasing the sensitivity level of the optical receiver 14, the optical receiver 14 at 635 may generate time-varying measurements of the back-reflected signal for a far portion of the optical fiber link 20, which corresponds to a portion of the optical fiber link 20 after the selected transition point Tx. As noted above, the optical receiver 14 may be unable to generate and/or unable to reliably generate measurements for a transition period in which the optical receiver 14 switches to the high sensitivity level. As such, the resulting scan may include a gap portion for which the scan lacks reliable measurements.

At 640, the processor 18 may determine whether to perform an additional scan of the optical fiber link 20. In particular, the processor 18 may determine to perform an additional scan if the present scan of the optical fiber link 20 has completed and additional scans for the OTDR opaque trace remain. For example, if a length of the optical fiber link 20 is known, the processor 18 may determine that the present scan has completed if a sufficient amount of time has passed for the transmitted pulse to travel to the far end of the optical fiber link 20 and back. Additionally and/or alternatively, the processor 18 may determine that the present scan has completed if measurements of the back-reflected signal have fallen below a threshold level. Moreover, the processor 18 may determine additional scans remain if a predetermined period of time (e.g., 180 seconds) allotted to generating the OTDR opaque trace has yet to expire or a predetermined number of scans for generating the OTDR opaque trace have yet to be performed.

If an additional scan is to be performed, the processor 18 may return to 610 to prepare the optical receiver 14 for another scan at the next transition point of the set of transition points. Otherwise, the processor 18 may proceed to 645 in order to construct an OTDR range-extended trace from the multiple opaque scans of the optical fiber link 20. For example, the processor 18 may perform various signal processing functions upon the time-varying measurements generated for the near portions and far portions of each pulse of the probe signal so as to construct a near portion of the OTDR range-extended trace. In some embodiments, the processor 18 may further augment the OTDR range-extended trace based on the measurements used to construct the OTDR probe trace at 435. However, unlike the OTDR clear trace process of FIG. 4B, the time-varying measurements encompass the full range (i.e., there is no gap portion due to transitioning at a same single point each scan). While the process of FIG. 4C lacks a gap portion, the processor 18 does have fewer time-varying measurements for each transition period (e.g., transition periods T1, T2, T3, T4 of FIGS. 3B-3F). Assuming non-overlapping transition periods and four transition periods associated with four transition points, each transition period may include fewer time-varying measurements for each optical fiber link distance than acquired for optical fiber link distances associated with non-transition periods. Moreover, each transition period may include measurements acquired by the optical receiver 14 while operating at the low sensitivity level and measurements acquired by the optical receiver 14 while operating at the high sensitivity level. As such, the processor 18 may appropriately scale the measurements and account for the fewer measurements so as to construct an OTDR range-extended trace from the opaque scans.

At 650, the processor 18 may output the full OTDR range-extended trace via an output device 19. For example, the processor 18 may display a graphical depiction (e.g., FIG. 3F) of the OTDR range-extended trace via the display device and/or transmit the OTDR range-extended trace and/or associate measurements to another device for further processing and/or presentation.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. An optical time domain reflectometry (OTDR) device, comprising:
   an optical transmitter configured to generate a probe signal comprising a train of pulses;
   an optical receiver configured to generate time-varying measurements of a back-reflected signal resulting from injection of respective pulses of the probe signal into an optical fiber link;
   an optical coupler configured to inject the probe signal from the optical transmitter into the optical fiber link and direct the back-reflected signal from the optical fiber link to the optical receiver; and
   a processor configured to:
      generate a probe trace of the optical fiber link from first time-varying measurements of the back-reflected signal;
      identify one or more ranges of the probe trace that are clear of events;
      select an intra-scan first transition point such that the optical receiver transitions from a first operating setting to a second operating setting during a range of the one or more identified ranges that is clear of events; and
      generate a range-extended trace of the optical fiber link from second time-varying measurements of the back-reflected signal in which the optical receiver transitions from the first operating setting to the second operating setting at the intra-scan first transition point.

2. The OTDR device of claim 1, wherein:
   the optical receiver comprises one or more gain levels; and
   the processor is configured to cause the optical receiver to transition to a higher gain level than its current gain level at the intra-scan first transition point.

3. The OTDR device of claim 2, wherein the processor is configured to cause the optical receiver to transition to one of its lower gain levels prior to each pulse of the probe signal.

4. The OTDR device of claim 2, wherein:
   the optical receiver comprises one or more attenuation levels; and
   the processor is configured to cause the optical receiver to transition to a lower attenuation level than its current attenuation level at the intra-scan first transition point.

5. The OTDR device of claim 4, wherein the processor is configured to cause the optical receiver to transition to one of its higher attenuation levels prior to each pulse of the probe signal.

6. An optical time domain reflectometry (OTDR) device, comprising:
   an optical transmitter configured to generate a probe signal comprising a train of pulses;
   an optical receiver configured to generate time-varying measurements of a back-reflected signal resulting from injection of respective pulses of the probe signal into an optical fiber link;
   an optical coupler configured to inject the probe signal from the optical transmitter into the optical fiber link and direct the back-reflected signal from the optical fiber link to the optical receiver; and
   a processor configured to:
      generate a probe trace of the optical fiber link from first time-varying measurements of the back-reflected signal;
      identify one or more ranges of the probe trace that are clear of events; and
      select an intra-scan first transition point based on the probe trace such the back-reflected signal does not saturate the optical receiver after the optical receiver transitions from a first operating setting to a second operating setting at the intra-scan first transition point; and
      generate a range-extended trace of the optical fiber link from second time-varying measurements of the back-reflected signal in which the optical receiver transitions from the first operating setting to the second operating setting at the intra-scan first transition point.

7. An optical time domain reflectometry (OTDR) device, comprising:
   an optical transmitter configured to generate a probe signal comprising a train of pulses;
   an optical receiver configured to generate time-varying measurements of a back-reflected signal resulting from injection of respective pulses of the probe signal into an optical fiber link;
   an optical coupler configured to inject the probe signal from the optical transmitter into the optical fiber link and direct the back-reflected signal from the optical fiber link to the optical receiver; and
   a processor configured to:
      generate a probe trace of the optical fiber link from first time-varying measurements of the back-reflected signal;
      identify one or more ranges of the probe trace that are clear of events;
      select an intra-scan first transition point based on the probe trace such that the intra-scan first transition point is within a dynamic range of the optical receiver when operating per a first operating setting; and
      generate a range-extended trace of the optical fiber link from second time-varying measurements of the back-reflected signal in which the optical receiver transitions from the first operating setting to a second operating setting at the intra-scan first transition point.

8. An optical time domain reflectometry (OTDR) device, comprising:
   an optical transmitter configured to generate a probe signal comprising a train of pulses;
   an optical receiver configured to generate time-varying measurements of a back-reflected signal resulting from injection of respective pulses of the probe signal into an optical fiber link;
   an optical coupler configured to inject the probe signal from the optical transmitter into the optical fiber link and direct the back-reflected signal from the optical fiber link to the optical receiver; and a processor configured to:
generate a probe trace of the optical fiber link from first time-varying measurements of the back-reflected signal;
identify an intra-scan first transition point from the probe trace;
select an intra-scan second transition point in response to determining that the probe trace lacks a suitable range that is clear of events; and
generate a range-extended trace of the optical fiber link from first scans comprising second time-varying measurements of the back-reflected signal in which the optical receiver transitions from a first operating setting to a second operating setting at the intra-scan first transition point and from second scans comprising third time-varying measurements of the back-reflected signal in which the optical receiver transitions from the first operating setting to the second operating setting at the intra-scan second transition point.

9. The OTDR device of claim 8, wherein the processor is configured to select the intra-scan second transition point such that the back-reflected signal does not saturate the optical receiver after the optical receiver transitions from the first operating setting to the second operating setting at the intra-scan second transition point.

10. The OTDR device of claim 8, wherein:
the optical receiver comprises one or more gain levels; and
the processor is configured to cause the optical receiver to transition to a higher gain level than its current gain level at the intra-scan first transition point.

11. A method of an optical time domain reflectometry (OTDR) device, the method comprising:
generating, with the OTDR device, a probe signal comprising a train of pulses and injecting the probe signal into an optical fiber link;
generating, with the OTDR device, time-varying measurements of a back-reflected signal resulting from injection of respective pulses of the probe signal into the optical fiber link;
generating, with the OTDR device, a probe trace of the optical fiber link from first time-varying measurements of the back-reflected signal;
identifying, with the OTDR device, one or more ranges of the probe trace that are clear of events;
selecting, with the OTDR device, an intra-scan first transition point such that the OTDR device transitions from a first operating setting to a second operating setting during a range of the one or more identified ranges that is clear of events; and
generating, with the OTDR device, a range-extended trace of the optical fiber link from second time-varying measurements of the back-reflected signal in which the OTDR device transitions from the first operating setting to the second operating setting at the intra-scan first transition point.

12. The method of claim 11, comprising transitioning the OTDR device to a higher gain level than its current gain level at the intra-scan first transition point.

13. The method of claim 12, comprising transitioning the OTDR device to a lower gain level prior to each pulse of the probe signal.

14. The method of claim 11, comprising transitioning the OTDR device to a lower attenuation level than its current attenuation level at the intra-scan first transition point.

15. The method of claim 14, comprising transitioning the OTDR device to a higher attenuation levels prior to each pulse of the probe signal.

16. A method of an optical time domain reflectometry (OTDR) device, the method comprising:
generating, with the OTDR device, a probe signal comprising a train of pulses and injecting the probe signal into an optical fiber link;
generating, with the OTDR device, time-varying measurements of a back-reflected signal resulting from injection of respective pulses of the probe signal into the optical fiber link;
generating, with the OTDR device, a probe trace of the optical fiber link from first time-varying measurements of the back-reflected signal;
identifying, with the OTDR device, one or more ranges of the probe trace that are clear of events;
selecting, with the OTDR device, an intra-scan first transition point such the back-reflected signal does not saturate the OTDR device after the OTDR transitions from a first operating setting to a second operating setting at the intra-scan first transition point; and
generating, with the OTDR device, a range-extended trace of the optical fiber link from second time-varying measurements of the back-reflected signal in which the OTDR device transitions from the first operating setting to the second operating setting at the intra-scan first transition point.

17. A method of an optical time domain reflectometry (OTDR) device, the method comprising:
generating, with the OTDR device, a probe signal comprising a train of pulses and injecting the probe signal into an optical fiber link;
generating, with the OTDR device, time-varying measurements of a back-reflected signal resulting from injection of respective pulses of the probe signal into the optical fiber link;
generating, with the OTDR device, a probe trace of the optical fiber link from first time-varying measurements of the back-reflected signal;
identifying, with the OTDR device, one or more ranges of the probe trace that are clear of events;
selecting, with the OTDR device, an intra-scan first transition point such that the intra-scan first transition point is within a dynamic range of the OTDR device when operating per a first operating setting; and
generating, with the OTDR device, a range-extended trace of the optical fiber link from second time-varying measurements of the back-reflected signal in which the OTDR device transitions from the first operating setting to a second operating setting at the intra-scan first transition point.

18. A method of an optical time domain reflectometry (OTDR) device, the method comprising:
generating, with the OTDR device, a probe signal comprising a train of pulses and injecting the probe signal into an optical fiber link;
generating, with the OTDR device, time-varying measurements of a back-reflected signal resulting from injection of respective pulses of the probe signal into the optical fiber link;
generating, with the OTDR device, a probe trace of the optical fiber link from first time-varying measurements of the back-reflected signal;

identifying, with the OTDR device, an intra-scan first transition point from the probe trace; and selecting, with the OTDR device, an intra-scan second transition point in response to the OTDR device determining that the probe trace lacks a suitable range that is clear of events; and generating, with the OTDR device, a range-extended trace of the optical fiber link from first scans comprising second time-varying measurements of the back-reflected signal in which the OTDR device transitions from a first operating setting to a second operating setting at the intra-scan first transition point and from second scans comprising third time-varying measurements of the back-reflected signal in which the OTDR device transitions from the first operating setting to the second operating setting at the intra-scan second transition point.

19. The method of claim 18, comprising selecting the intra-scan second transition point such that the back-reflected signal does not saturate the OTDR device after transitioning from the first operating setting to the second operating setting at the intra-scan second transition point.

20. The method of claim 18, comprising transitioning the OTDR device to a lower gain level prior to each pulse of the probe signal.

* * * * *